United States Patent
Hoshino et al.

(10) Patent No.: US 7,601,442 B2
(45) Date of Patent: Oct. 13, 2009

(54) JIG FOR CALCINING ELECTRONIC COMPONENT

(75) Inventors: Kazutomo Hoshino, Ageo (JP); Hitoshi Kajino, Ageo (JP); Yasuhisa Idutsu, Omuta (JP); Koushi Horiuchi, Omuta (JP)

(73) Assignee: Mitsu Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 12/166,734

(22) Filed: Jul. 2, 2008

(65) Prior Publication Data
US 2008/0274871 A1    Nov. 6, 2008

Related U.S. Application Data

(62) Division of application No. 10/525,758, filed on Feb. 28, 2005, now abandoned.

(51) Int. Cl.
*B32B 15/04* (2006.01)
*B32B 18/00* (2006.01)

(52) U.S. Cl. .................... 428/701; 118/500; 219/444.1; 219/548; 432/258

(58) Field of Classification Search ............... 428/701, 428/702
See application file for complete search history.

(56) References Cited

U.S. PATENT DOCUMENTS

| | | | |
|---|---|---|---|
| 3,860,432 A | 1/1975 | Higuchi et al. | |
| 5,804,324 A | 9/1998 | Niwa et al. | |

FOREIGN PATENT DOCUMENTS

| | | | |
|---|---|---|---|
| JP | 02106692 A | * | 4/1990 |
| JP | 3139962 | | 11/1997 |
| JP | 2002-114578 | | 4/2000 |
| JP | 2001-130084 | | 5/2001 |
| JP | 2001-213666 | | 8/2001 |
| JP | 2001-322875 | | 11/2001 |
| JP | 2002-037676 | | 2/2002 |
| JP | 2002-128582 | | 5/2002 |

\* cited by examiner

*Primary Examiner*—John J. Zimmerman
*Assistant Examiner*—Aaron Austin
(74) *Attorney, Agent, or Firm*—Young & Thompson

(57) ABSTRACT

A jig for calcining an electronic component including a substrate 11 and a zirconia layer 12 coated on a surface of the substrate characterized in that the zirconia layer including one or more metal oxides forming a liquid phase is calcined for improving peel-off resistance and wear resistance to crystallize the liquid phase after the calcination. In the jig for calcining the electronic component, when the zirconia layer is formed by using an inexpensive method such as an application method, the zirconia layer is not peeled off from the substrate, and grains are not detached.

14 Claims, 3 Drawing Sheets

JIG FOR CALCINING ELECTRONIC COMPONENT

RELATED APPLICATION

This application is a divisional of U.S. patent application Ser. No. 10/525,758, filed Feb. 28, 2005, now abandoned which is incorporated by reference in its entirety.

TECHNICAL FIELD

The present invention relates to a jig for calcining an electronic component such as a setter, a shelf board and a saggar for calcining the electronic component such as a dielectric, a multi-layered capacitor, a ceramic capacitor, a piezoelectric element and a thermistor.

BACKGROUND ART

A jig for calcining an electronic component is required to be unreactive with ceramic electronic components to be calcined in addition to having heat resistance and mechanical strength. When an electronic component work such as a dielectric is contacted and reacted with the calcination jig, a problem arises that the characteristics may be deteriorated due to the fusion or the composition fluctuation of the work.

The substrate for the jig for calcining the electronic component generally includes an alumina-based material, an alumina-mullite-based material, an alumina-zirconia-based material, an alumina-magnesia-based spinel material, an alumina-mullite-cordierite-based material and a combination thereof.

In order to prevent the contact of the jig with the work, a method of coating zirconia (zirconium oxide) on the surface layer is employed. Although the reactivity of the zirconia with the substrate is low, the coating of the jig may be cleaved or peeled off under an environment in which the repeated heat cycles take place due to the larger difference between thermal expansion coefficients of the substrate and the zirconia. When the jig is repeatedly used and the particles contained in the surface zirconia layer has a lower particle removal resistance or a lower abrasion resistance, the fine particles are mixed in electronic components to cause a severe problem.

The phase change from a monoclinic system to a tetragonal system takes place in the zirconia at around 1100° C. As a result, a problem arises that the change of the thermal expansion coefficient accompanied with the phase transformation due to the repeated heat cycles eliminates the coated layer of the zirconia to generate cracks so that electronic components to be calcined are likely to be influenced by the substrate.

In order to solve these problems, a jig for calcining an electronic component has been proposed in which an intermediate layer made of aluminum oxide (alumina) is disposed between the zirconia surface layer and the substrate. However, in the jig for calcining the electronic component, the sintered ability of the alumina acting as the intermediate layer is inferior and the alumina has only insufficient adhesion between the zirconia surface layer and the substrate. Accordingly, the jig has a defect that the peeling-off of the zirconia surface layer cannot be prevented against the thermal stress generated by the expansion and the contraction of the zirconia surface layer due to the heat cycles.

An application method, a dip-coating method and a spray-coating method are used for forming the zirconia layer (or zirconia film) on the substrate surface of the jig for calcining the electronic component. In these methods relatively inexpensive and suitable for industrial production, the anti-grain detaching property and the anti-abrasion property of the formed zirconia layer may be insufficient. Especially, under the circumstance in which the heat cycles are repeatedly loaded on the jig for calcining the electronic component, the zirconia layer may be peeled off from the substrate and the grains may be detached.

In order to overcome these defects, a jig for calcining an electronic component has been proposed in which a partially fused-bonding agent made of a metal oxide is added to a zirconia layer as shown in JP-A-2001-213666 (paragraph 0011) and JP-A-8(1996)-253381. For example, in JP-A-2001-213666, a jig for calcining an electronic component including a partially fused-bonding agent containing aluminum oxide ($Al_2O_3$) as an essential component into which one or more, and preferably two or more metal oxides selected from yttrium oxide ($Y_2O_3$), calcium oxide (CaO), magnesium oxide (MgO) and strontium oxide, (strontia, SrO) are added is disclosed.

The partially fused-bonding agent in the jig for calcining the electronic component binds coarse zirconia and/or fine zirconia to increase the strength and to elevate the adhesion with the substrate, thereby suppressing the peeling-off and the pulverization of the zirconia layer. Accordingly, the jig with the sufficient strength can be economically fabricated.

Since, however, the partially fused-bonding agent described in JP-A-2001-213666 contains the second, third or subsequent metal oxide as the essential component in addition to the essential aluminum oxide, the choice range is rather narrow so that the jig for calcining the electronic component containing the partially fused-bonding agent in which a wider range of metal oxides can be used has been requested.

In the jig for calcining the electronic component in which only the top surface of the substrate is coated with the zirconia, the contraction of the top surface of the substrate likely becomes larger than that of the bottom surface during the calcination and during the repeated use so that the substrate may be warped to generate a curvature. In order to overcome the problem, jigs for calcining electronic components have been proposed in which the bottom surface of the substrate is coated with the same zirconia in addition to the top surface thereof (JP-A-2002-37676, JP-A-2001-130084 and JP-B-3139962).

In the jig for calcining the electronic component having the three-layer structure having the zirconia on the top and bottom surfaces, the investigation with respect to the performance elevation is insufficient. Although the warp can be prevented, the other performance such as peel-off resistance has not bee sufficiently elucidated.

DISCLOSURE OF INVENTION

An object of the present invention is to elevate various characteristics of a jig for calcining an electronic component by investigating materials and structures of the conventional jig for calcining the electronic component having the above problems.

A first subject of the present invention is, among the above problems of the prior art, to provide a jig for calcining an electronic component in which, when a zirconia layer is formed by using an inexpensive method such as an application method, the zirconia layer is not peeled off from a substrate and grains are not detached.

A second subject of the present invention is, among the above problems of the prior art, to provide a jig for calcining an electronic component having the various excellent characteristics, especially, such as peel-off resistance and strength by changing the material of an intermediate layer.

A third subject of the present invention is, among the above problems of the prior art, to provide a jig for calcining an electronic component with a zirconia layer having the higher strength and the excellent adhesion with a substrate by using a wider range of metal oxides with minimum restriction by means of eliminating the restriction of use of a partially fused-bonding agent.

A fourth subject of the present invention is, among the above problems of the prior art, to provide a jig for calcining an electronic component with a three-layered structure having a zirconia layer and a metal oxide coated layer on top and bottom surfaces thereof so that its performances can be elevated.

The present invention is, firstly, a jig for calcining an electronic component including a substrate and a zirconia layer coated on a surface of the substrate characterized in that the zirconia layer including one or more metal oxides forming a liquid phase is calcined for improving peel-off resistance and wear resistance to crystallize the liquid phase after the calcination (hereinafter also referred to as first invention).

The present invention is, secondly, a jig for calcining an electronic component including a substrate, an intermediate layer containing aluminum oxide and coated on a surface of the substrate and a zirconia surface layer coated on the intermediate layer characterized in that the intermediate layer contains at least one metal oxide acting as a sintering aid for improving the peel-off resistance during the calcination of the jig for calcining the electronic component including the zirconia surface layer/the intermediate layer/the substrate (hereinafter also referred to as second invention).

The present invention is, thirdly, a jig for calcining an electronic component including a substrate and a zirconia layer prepared by bonding coarse zirconia having an average particle size from 30 to 500 μm and fine zirconia having an average particle size from 0.1 to 10 μm by using a partially fused-bonding agent and coated on the substrate characterized in that the partially fused-bonding agent is (a) aluminum oxide or alumina-magnesia-based spinel composite oxide, (b) a mixture of one or more metal oxides selected from the group consisting of rare earth metal oxides, transition metal oxides and alkaline earth metal oxides, and aluminum oxide, (c) a mixture of two or more metal oxides selected from the group consisting of rare earth metal oxides, transition metal oxides and alkaline earth metal oxides, or (d) a mixture of one or more metal oxides selected from the group consisting of rare earth metal oxides, transition metal oxides and alkaline earth metal oxides, and alumina-magnesia-based spinel-type composite oxide (hereinafter also referred to as third invention).

The present invention is, fourthly, a jig for calcining an electronic component including a substrate, a zirconia surface layer formed on a top surface of the substrate and a metal oxide coated layer formed on a bottom surface of the substrate characterized in that (a) an intermediate layer is formed between the substrate and the zirconia surface layer and/or between the substrate and the metal oxide coated layer, or (b) at least one of the zirconia surface layer and the metal oxide coated layer contains a sintering aid made of one or more metal oxides, or (c) a metal oxide coated layer is formed on a side surface of the substrate, or (d) the metal oxide coated layer does not contain zirconia (hereinafter also referred to as fourth invention).

The present invention will be described in detail.

In the first invention, one or more metal oxides selected from the group consisting of the rare earth oxide such as yttrium oxide and lanthanum oxide, the alkaline earth oxide such as calcium oxide and barium oxide, and the transition metal oxide such as titanium oxide, niobium oxide and manganese oxide; or aluminum oxide is selected as the metal oxide for forming a liquid phase contained in the zirconia layer. Thereby, the jig for calcining the electronic component excellent in the peel-off resistance and the wear resistance can be provided.

The selection of one or more of the metal oxides or the aluminum oxide in the first invention allows the reaction between the two or more oxides including the zirconia layer having these oxides as a main component. A part of the reaction product is melted to form the liquid phase to strengthen the bonding between the zirconia particles. Further, the reaction product is desirably crystallized after the sintering upon the formation of the liquid phase. The crystallization excellently maintains the durability of the zirconia layer at a temperature an electronic component is calcined, for example, at 1300° C.

The metal oxides contained in the zirconia layer can be added as a composite oxide. For example, when two kinds of oxides, that is, barium oxide and titanium oxide are added, they can be added as a suitable amount of barium titanate composite oxide.

An amount of impurities such as zinc oxide, bismuth oxide, sodium oxide and silicon oxide other than the metal oxides contained in the zirconia layer is preferably 5% in weight or less at the maximum and more preferably 1% in weight or less. The impurities exceeding 5% in weight reduce the liquid phase forming temperature so that the liquid phase is formed even at the calcining temperature of the electronic component, e.g. at 1300° C., thereby causing the reaction with the electronic component to be calcined on the zirconia layer surface and decreasing the peel-off resistance. Accordingly, the impurities exceeding 5% in weight likely form a glassy phase to cause the deformation of the zirconia layer or the significant reduction of the bonding strength.

The size of the metal oxide particles added to the zirconia layer is selected to be from 0.1 μm to 10 μm, and is preferably 10 μm or less when they are added as a component of forming the liquid phase. Non-stabilized, partially-stabilized or stabilized zirconia can be used as the zirconia particles forming the zirconia layer as the main component. The particle size thereof can be selected in consideration of the surface roughness of the zirconia layer and the pore size. For example, an average particle size is 100 μm.

Fine particles having an average particle size of 1 μm and coarse particles having an average particle size of 100 μm may be combined to provide the zirconia particles acting as the main component. In this case, the fine zirconia and the added metal oxide react with each other to form the liquid phase to increase the bonding strength of the zirconia layer.

An amount of the metal oxide added to the zirconia layer is preferably from 0.1% in weight to 20% in weight, and the amount exceeding these values causes the reaction with the electronic component work and the formation of the glassy phase to reduce the peel-off resistance.

The zirconia layer on the substrate surface can be formed by using a conventional method such as a method in which a zirconia compound solution is applied and thermally decomposed, a method in which the zirconia compound solution or zirconia powders and the selected metal oxide solution are spray-coated and a method in which a substrate dipped in the solution is thermally decomposed such that the compound is converted into zirconia. The substrate used may be the same as a conventional one such as an aluminum-based material, an alumina-mullite-based material, an alumina-magnesia-based spinel material, an alumina-mullite-cordierite-based material or the combination thereof.

The temperature for calcining the jig for calcining the electronic component including the substrate and the zirconia layer is desirably higher than that at which the electronic component is actually calcined, thereby preventing the deterioration of the jig for calcining the electronic component during the use. Since the temperature for calcining the jig for calcining the electronic component is ordinarily from 1200 to 1400° C., the temperature for calcining the zirconia layer is preferably from 1300 to 1600° C.

The zirconia layer of the present invention is formed by using a thicker film forming method which can be inexpensively carried out, and the jig for calcining the electronic component having the zirconia layer excellent in the peel-off resistance and the wear resistance can be provided.

As described above, the second invention is a jig for calcining an electronic component including a substrate, an intermediate layer containing aluminum oxide (alumina) and coated on a surface of the substrate and a zirconia surface layer coated on the intermediate layer characterized in that the intermediate layer contains at least one metal oxide acting as a sintering aid for improving the peel-off resistance during the calcination of the jig including the zirconia surface layer/the intermediate layer/the substrate.

The selection of one or more of the metal oxides selected from the rare earth metal oxides such as cerium oxide and lanthanum oxide excluding yttrium oxide, the transition metal oxide such as titanium oxide, niobium oxide and manganese oxide excluding zirconium oxide, and barium oxide; and aluminum oxide acting as the metal oxide of a sintering aid contained in the alumina intermediate layer in the second invention can provide the jig for calcining the electronic component formed by the zirconia surface layer/the alumina intermediate layer/the substrate including the alumina intermediate layer excellent in the peel-off resistance.

The selected one or more of the metal oxides in the second invention act as the sintering aid. The reaction takes place among the two or more oxides including the alumina and the sintering aid as the main components of the intermediate layer, and a part thereof is melted to form a liquid phase to elevate the peel-off resistance between the zirconia surface layer and the alumina intermediate layer and between the alumina intermediate layer and the substrate and further to strengthen the bonding among the zirconia and alumina particles and among the alumina particles. These reaction products are desirably crystallized by the sintering after the liquid phase is formed. The crystallization excellently maintains the peel-off resistance and the crack-developing resistance of the alumina intermediate layer at the temperature the electronic component is calcined, for example, at 1300° C.

A composite oxide may be added as the metal oxides contained in the alumina intermediate layer. For example, the barium titanate composite oxide can be added as the composite oxide formed between the barium oxide and the titanium oxide.

Impurities such as zinc oxide, bismuth oxide, sodium oxide and silicon oxide other than the metal oxides contained in the alumina intermediate layer may promote the reaction with the above metal oxides. However, an amount of the impurities is preferably 1% in weight or less and 5% in weight at the maximum.

The impurities exceeding 5% in weight may create the cracks in the surface layer by means of the excessive sintering or may lower the liquid phase forming temperature so that the liquid phase is formed even at the calcining temperature of the electronic component, e.g. at 1300° C., thereby decreasing the peel-off resistance between the zirconia surface layer and the alumina intermediate layer or between the alumina intermediate layer and the substrate. The impurities exceeding 5% in weight likely form a glassy phase after the sintering of the alumina intermediate layer to reduce the strength of the intermediate layer.

The size of the metal oxide particles added to the alumina intermediate layer is selected to be from 0.1 µm to 100 µm, and is preferably 10 µm or less when they are added as the sintering aid. The size of the alumina particles forming the intermediate layer as the main component is suitably selected depending on the matching with the zirconia surface layer and the substrate, and the average particle size is ordinarily from 1 to 100 µm though coarse particles and fine particles are combined or particles having wider particle distribution can be selected.

In this case, the fine alumina and the added metal oxides react to act as the sintering auxiliary agent or to form the liquid phase to strengthen the bonding strength of the alumina intermediate layer.

An amount of the added metal oxides with respect to the alumina acting as the main component is preferably from 0.1% in weight to 20% in weight. The amount excessive to the value diffuses the element added to the intermediate layer into the zirconia surface layer so that problems arise that the ill effects are exerted on the zirconia surface layer or the glassy phase is formed in the intermediate layer to deteriorate the peel-off resistance.

An application-thermal decomposition method, a spray method and a dip-coating method can be used for forming the intermediate layer on the substrate surface. In the application-thermal decomposition method, a metal salt aqueous solution of the corresponding metal such as nitrate is applied on the substrate and thermally decomposed to be converted into the corresponding metal oxide which is coated on the substrate surface. In the spray method, a solvent having suspended metal oxide particles with the specified particle size is sprayed on the substrate surface to coat the substrate surface with the metal oxide after the solvent is scattered. In the dip-coating method, the substrate is dipped in a solution dissolving or suspending the corresponding metal oxide to form a liquid layer containing the metal oxide on the substrate surface, thereby forming the metal oxide layer after the drying for removing the solvent.

In the application-thermal decomposition method and the dip-coating method, the particle size of the metal oxide is hardly controllable so that the spray method in which the metal oxide particles having the specified particle size are directly sprayed is desirably used when the intermediate layer made of the metal oxide having the desired particle distribution, for example, the metal oxide made of the coarse particles and the fine particles described above is formed.

The thickness of the intermediate layer is not especially restricted, and from 10 to 200 µm is preferable when it is made of only the metal oxide particles. The thickness of the intermediate layer can be arbitrarily adjusted by taking account of the sprayed amount of the metal or the metal compound on the substrate, the coated amount of the solution of the metal or the metal compound, and the amount of the removed solvent in the respective fabricating methods.

The intermediate layer thus formed is converted into the intermediate layer by means of higher temperature calcination. The calcining temperature is desirably higher than that at which the electronic component is actually calcined for preventing the deterioration of the jig for calcining the electronic component of the second invention. Since the temperature for calcining the jig is ordinarily from 1200 to 1400° C., the temperature for calcining the intermediate layer is preferably from 1300 to 1600° C. The calcination of the intermediate layer may be conducted simultaneously with the calcination of the zirconia surface layer after the zirconia surface layer is formed, thereby reducing the number of the calcination steps.

The zirconia surface layer is formed on the intermediate layer thus formed. The fabrication method includes the application-thermal decomposition method, the spray method and the dip-coating method similarly to the intermediate layer.

The zirconia layer can be formed by calcining the zirconia with random particle size. However, when coarse particles and fine particles, for example, zirconia coarse particles having an average particle size from 30 to 500 μm and zirconia fine particles having an average particle size from 0.1 to 10 μm are mixed, the voids are formed in the surface layer by the coarse zirconia particles having the higher porosity. The void-forming ability of the zirconia surface layer in addition to the void-forming ability of the intermediate layer more completely absorbs and alleviates the difference between the thermal expansion coefficients of the zirconia surface layer and the intermediate layer. The coarse particles with respect to the entire composition is desirably 90% in weight or less in case of the zirconia surface layer.

Specifically, non-stabilized zirconia, partially-stabilized zirconia and stabilized zirconia can be used as the material of the zirconia surface layer. The zirconia surface layer in direct contact with the electronic component shall not exert ill-effects on the electronic component. Accordingly, the zirconia partially-stabilized or stabilized with yttria, calcia and magnesia or the mixture thereof can be desirably used.

The zirconia is a monoclinic system at ambient temperature, and the phase change takes place with the temperature rise from monoclinic system→(1170° C.)→tetragonal system→(2370° C.) to cubic system. The higher temperature phases such as the tetragonal system and the cubic system can be "stabilized" under the ambient temperature by solid-solubilizing a partially fused-bonding agent (stabilizing agent) such as yttria and magnesia in the zirconia.

The substrate used may be an ordinary ceramic-based fireproofing material, and, for example, an alumina-based material, an alumina-mullite-based material, an alumina-mullite-cordierite-based material or a combination thereof is used. The substrate used may also be a porcelain or a baked-mud.

In accordance with the second invention having the above configuration, the jig for calcining the electronic component having the intermediate layer excellent in the various characteristics especially such as the peel-off resistance and the strength can be provided in place of the conventional alumina intermediate layer.

Then, in the third invention, when the jig for calcining the electronic component is configured by coating the zirconia layer containing the coarse zirconia having the average particle size from 30 to 500 μm and the fine zirconia having the average particle size from 0.1 to 10 μm on the substrate, the partially fused-bonding agent is used to reinforce the strength for preventing the peel-off.

When the zirconia layer is formed only by the coarse zirconia, the denseness of the zirconia layer is not sufficiently achieved thereby forming many pores so that the difference of the thermal expansion coefficient with that of the substrate is alleviated or absorbed. Further, the use of the fine particulate partially fused-bonding agent elevates the adhesion between the zirconia layer and the substrate to achieve the compatibility between "the prevention of the peel-off by the decrease of the difference of the thermal expansion coefficients between the substrate and the zirconia layer" and "the elevation of the adhesion between the substrate and the zirconia layer".

In the third invention, the zirconia layer is formed by using the coarse zirconia having the average particle size from 30 to 500 μm and the fine zirconia having the average particle size from 0.1 to 10 μm which are bonded with the above partially fused-bonding agent. In the invention, the simultaneous use of the fine zirconia elevates the strength of the zirconia layer more prominently compared with the case only the coarse zirconia is used, and in addition to this, "the prevention of the peel-off by the decrease of the difference of the thermal expansion coefficients between the substrate and the zirconia layer" and "the elevation of the adhesiveness between the substrate and the zirconia layer" can be achieved.

The material of calcining the electronic component contains the zirconia as a main component, and the coarse zirconia having the average particle size from 30 to 500 μm and the fine zirconia having the average particle size from 0.1 to 10 μm as essential components. When the average particle size of the coarse zirconia is below 30 μm, the effect of alleviating the stress by the thermal expansion difference with the substrate is small so that the peel-off is likely to take place. The coarse zirconia having the average particle size over 500 μm reduces the performance in connection with the sintering. When the average particle size of the fine zirconia is below 0.1 μm, the particle size difference with the coarse zirconia becomes excessively larger to reduce the effect of elevating the adhesion between the coarse zirconia and the substrate. The fine zirconia having the average particle size over 10 μm close to the coarse zirconia reduces the effect of the coarse zirconia addition.

The weight ratio between the coarse zirconia and the fine zirconia is desirably 75:25 to 25:75, and the performance in connection with the sintering may become worse or the peel-off may take place because the thermal expansion difference cannot be alleviated or absorbed outside of the above range.

Non-stabilized zirconia, partially-stabilized zirconia, stabilized zirconia or the mixture thereof is desirably used as the coarse zirconia by taking account of the reactivity with the electronic component. The stabilization or the partial stabilization can be attained by adding yttrium oxide (yttria, $Y_2O_3$), calcium oxide (calcia, CaO) or magnesium oxide (magnesia, MgO) to the zirconia.

The zirconia takes a monoclinic system at ambient temperature, and the phase change takes place with the temperature rise from monoclinic system→(1170° C.)→tetragonal system→(2370° C.)→to cubic system. The higher temperature phases such as the tetragonal system and the cubic system can be "stabilized" under the ambient temperature by solid-solubilizing the partially fused-bonding agent (stabilizing agent) such as yttria and magnesia in the zirconia. Although the volume change occurs in the non-stabilized zirconia due to the phase transformation from the monoclinic system to the tetragonal system, no phase transformation takes place in the stabilized zirconia in which the partially fused-bonding agent is solid-solubilized.

The substrate may be an ordinary ceramics-based refractory material which includes, for example, alumina-based, alumina-mullite-based, alumina-mullite-cordierite-based material and a combination thereof.

In accordance with the second invention having the above configuration, the jig for calcining the electronic component can be provided having, in place of the conventional alumina intermediate layer, the intermediate layer with the various excellent characteristics, especially, such as peel-off resistance and strength.

Then, in the third invention, when the jig is configured by coating the zirconia layer having the coarse zirconia having the average particle size from 30 to 500 μm and the fine zirconia having the average particle size from 0.1 to 10 μm on the substrate, the strength of the jig is reinforced by using the partially fused-bonding agent to prevent the peel-off.

When the coarse zirconia is singly used, the sufficient denseness of the zirconia layer is not obtained so that many pores formed therein alleviate or absorb the difference of the thermal expansion with the substrate. Further, the use of the fine-particle partially fused-bonding agent increases the adhesion between the zirconia layer and the substrate, thereby achieving "the prevention of the peel-off in accordance with the decrease of the difference between the thermal expansion coefficients of the substrate and the zirconia layer" and "the increase of the adhesion between the substrate and the zirconia layer", which have been conventionally incompatible.

In the third invention, the zirconia layer is formed by using the coarse zirconia having the average particle size from 30 to 500 μm and the fine zirconia having the average particle size from 0.1 to 10 μm and by binding these with the above partially fused-bonding agent. In this invention, the simultaneous use of the fine zirconia increases the strength of the zirconia layer more than that in which only the coarse zirconia is used, and then, "the prevention of the peel-off in accordance with the decrease of the difference between the thermal expansion coefficients of the substrate and the zirconia layer" and "the increase of the adhesion between the substrate and the zirconia layer" can be achieved.

The material for calcining the electronic component of the third invention includes the zirconia as the main component and the coarse zirconia having the average particle size from 30 to 500 μm and the fine zirconia having the average particle size from 0.1 to 10 μm as the essential components. The average particle size of the coarse zirconia below 30 μm provides a smaller stress relaxation effect produced by the thermal expansion difference with the substrate to easily generate the peel-off. The average particle size of the coarse zirconia over 500 μm reduces the sintered ability. The average particle size of the fine zirconia below 0.1 μm reduces the effect of increasing the adhesion between the coarse zirconia and the substrate because the difference of the particle size with the coarse zirconia is too large. The average particle size of the fine zirconia over 10 μm reduces the effect of the addition of the fine zirconia because the particle size of the fine zirconia approaches to that of the coarse zirconia.

The weight ratio between the coarse zirconia and the fine zirconia is desirably from 75:25 to 25:75. Outside of the range, the sintered ability may be worsened or the thermal expansion difference cannot be alleviated nor absorbed to generate the peel-off.

Non-stabilized zirconia, partially-stabilized zirconia and stabilized zirconia or a mixture thereof is desirably used as the coarse zirconia in consideration of its reactivity with the electronic component. The stabilization or the partial stabilization can be achieved by adding yttrium oxide (yttria, $Y_2O_3$), calcium oxide (calcia, CaO) and magnesium oxide (magnesia, MgO) to the zirconia.

The zirconia takes a monoclinic system at ambient temperature, and the phase change takes place with the temperature rise from monoclinic system→(1170° C.)→tetragonal system→(2370° C.) to cubic system. The higher temperature phases such as the tetragonal system and the cubic system can be "stabilized" under the ambient temperature by solid-solubilizing the partially fused-bonding agent (stabilizing agent) such as yttria and magnesia in the zirconia. Although the volume change occurs in the non-stabilized zirconia due to the phase transformation from the monoclinic system to the tetragonal system, no phase transformation takes place in the stabilized zirconia in which the partially fused-bonding agent is solid-solubilized.

The partially fused-bonding agent to be added includes aluminum oxide (alumina, $Al_2O_3$) or alumina-magnesia-based spinel composite oxide ($Al_2MgO_4$) by itself, a mixture between the aluminum oxide and a transition metal oxide such as titanium oxide (titania, $TiO_2$) (including aluminum titanate composite oxide); or a mixture of two or more metal oxides selected from the group consisting of rare earth oxides, transition metal oxides and alkaline earth metal oxides; or a mixture between one or more metal oxides selected from the group consisting of the rare earth group metal oxides, the transition metal oxides and the alkaline earth metal oxide, and a spinel type composite oxide such as alumina-magnesia.

The rare earth oxide includes yttrium oxide, cerium oxide and lanthanum oxide, the transition metal oxide includes titanium oxide, niobium oxide and manganese oxide, and the alkaline earth metal oxide includes calcium oxide, barium oxide and strontium oxide.

The particle size of the metal oxide in the partially fused-bonding agent is selected within a range from 0.1 to 100 μm.

The aluminum oxide or the alumina-magnesia-based spinel composite oxide added by itself makes the matching between the substrate and the zirconia layer excellent. The above metal oxides other than the aluminum oxide have a function of stabilizing a part of the zirconia by a reaction with the zirconia particles on the surface of the non-stabilized zirconia through a liquid phase during the sintering.

The ratio of the partially fused-bonding agent with respect to the total amount of the zirconia and the partially fused-bonding agent is desirably about from 3 to 25% in weight. Below 3% in weight, the addition effect is likely to be insufficient. Over 25% in weight, the partially fused-bonding agent may permeate the substrate or may form a melt layer by itself other than the zirconia layer to reduce the adhesion.

These partially fused-bonding agents containing the metal oxide increase the strength of the zirconia layer by binding the coarse zirconia particles or the coarse zirconia particle and the fine zirconia particle during the sintering. In view of the zirconia sintering, the partially fused-bonding agent is desirably the particle from submicron to about 10 μm.

The zirconia layer (zirconia film) may be formed on the substrate surface by using any conventional method such that a zirconium compound solution is applied and thermally decomposed, zirconia powders are sprayed and, after a substrate is dipped in the zirconium compound solution, the compound is thermally converted into the zirconia. The substrate may be the same as the conventional ones including, for example, the alumina-based material, the alumina-mullite-based material, the alumina-magnesia-based spinel material, the alumina-mullite-cordierite-based material and a combination thereof.

The zirconia layer is not necessarily coated directly on the substrate surface, and an intermediate layer may be positioned between them. The intermediate layer may be made of alumina, alumina-zirconia or alumina-magnesia-based spinel. The intermediate layer makes excellent the matching between the zirconia layer and the substrate and can prevent the diffusion to the surface of an element such as silica harmful to an electronic component. The intermediate layer can be formed on the substrate surface by using a spray coating method or a dip coat method.

The calcination for forming the zirconia layer is desirably conducted at a temperature higher than that at which an electronic component is actually calcined so that the jig for calcining the electronic component of the present invention is not deteriorated during use. Since the ordinal calcining temperature of the electronic components is from 1200 to 1400°

C., the temperature of calcining the zirconia layer is preferably about from 1300 to 1600° C.

The existence of impurities such as zinc oxide, bismuth oxide, sodium oxide and silicon oxide other than the above metal oxides in the zirconia layer may promote the reaction. Even in this case, the impurity content is preferably 1% in weight or less, and desirably 5% in weight at the maximum.

The partially fused-bonding agent used in the third invention, when the aluminum oxide which increases the matching with the substrate by itself is contained alone, can provide the peel-off resistance and the wear resistance equal to or more than those when the aluminum oxide is conventionally combined with other metal oxides so that the partially fused-bonding agent inexpensively and easily prepared provides the electronic components having the desired strength.

The combination of the aluminum oxide, and one or more of the metal oxides selected from the rare earth metal oxides, the transition metal oxides and the alkaline earth metal oxides heretofore unknown also provides the effects equal to those of the partially fused-bonding agent having the known combination to broaden the options.

The partially fused-bonding agent which is a mixture of two or more metal oxides selected from the group consisting of the rare earth metal oxides, the transition metal oxides and the alkaline earth metal oxides is a novel substance heretofore non-existing, and can provide various partially fused-bonding agents applicable to broader conditions such as the calcination temperature. The spinel-type composite oxide may also be used.

Then, the fourth invention is, as mentioned above, the jig for calcining the electronic component characterized in that the intermediate layer is formed between the substrate and the zirconia surface layer and/or between the substrate and the metal oxide coated layer in the three-layered jig for calcining the electronic component (hereinafter referred to as first embodiment), the jig for calcining the electronic component characterized in that at least one of the zirconia surface layer and the metal oxide coated layer contains the sintering aid made of one or more metal oxides in the three-layered jig (hereinafter referred to as second embodiment), the jig for calcining the electronic component characterized in that the metal oxide coated layer is formed on the side surface of the substrate in the three-layered jig (hereinafter referred to as third embodiment), and further the jig for calcining the electronic component characterized in that the metal oxide coated layer is formed on the side surface of the substrate in the three-layered jig (hereinafter referred to as fourth embodiment).

As described, the subject matter of the fourth invention is the jig for calcining the electronic component having the zirconia surface layer on the top surface of the substrate and the metal oxide coated layer on the bottom surface of the substrate (three-layered jig).

In the two-layered jig for calcining the electronic component, especially, its substrate is thinner, the expansion and the contraction during the calcination may generate the stress and the deformation in the zirconia surface layer on the substrate surface to cause the warp. Especially, the recent jig is required to be light and easily-handled or to be light and thin so that its heat capacity is smaller in view of energy. As a result, a thin sheet or a thin pressed material is demanded as the substrate, and prevention of the warp easily generated therein is strongly desired.

On the other hand, in the three-layered jig of the fourth invention, the formation of the metal oxide coated layer on the bottom surface of the substrate in addition to the zirconia surface layer on the substrate top surface equalizes the stress and the deformation applied on the top and bottom surfaces of the substrate during the calcination to create no warps or to suppress its amount at the minimum even if the warp is created. The ratio between the zirconia surface layer on the substrate top surface and the metal oxide coated layer on the bottom surface of the substrate is adjusted to prevent the warp efficiently.

In case of a setter where a plurality of jigs are multiply superposed, the contamination of impurity vapor diffusing from the substrate bottom surface to the zirconia surface layer of the substrate top surface right beneath thereof is prevented in advance, thereby preventing the calcined electronic components from the contamination by the impurities.

In order to balance the stress and the deformation generated between the zirconia surface layer and the substrate and between the metal oxide coated layer and the substrate, when the film thickness of the zirconia surface layer is, for example, 200 μm, the film thickness of the metal oxide coated layer is desirably close to that, for example, from 100 to 200 μm. Thus, a thickness ratio of the zirconia surface layer to the metal oxide coated layer is from 3:4 to 20:7. However, the differences with respect to the compactness, the porosity, the sintered ability and the thermal expansion characteristics between the zirconia surface layer and the metal oxide coated layer should be considered. For example, the sintering aid can be added to the metal oxide coated layer to increase the sintered ability, or the metal oxide coated layer is densified to make its thickness thinner than that of the zirconia surface layer to balance the stress and the deformation.

In the fourth invention, the thickness of the zirconia surface layer and the metal oxide coated layer is 50 μm or more and 500 μm or less, and preferably 400 μm or less in view of the durability, the peel-off resistance and the fragility resistance against heat cycles. When the intermediate layer is formed, the total thickness of the zirconia surface layer and the intermediate layer is desirably in the same range.

The materials of the substrate of the jig of the fourth invention may be the same as those of the first to third inventions.

The main component of the material of the metal oxide coated layer formed on the bottom surface of the substrate is metal oxides such as zirconia, alumina, alumina-zirconia, alumina-magnesia spinel and magnesia. The preferable particle size of the metal oxide is from 0.1 to 100 μm, and metal oxide acting as a sintering aid for promoting the sintering can be added thereto similarly to the surface layer. The addition amount is ordinarily from 0.5 to 25% in weight. The main component herein refers to a component having a content over 50% in weight and 100% in weight or less.

In the first embodiment, the intermediate layer is formed between the substrate and the zirconia surface layer and/or between the substrate and the metal oxide coated layer in the three-layered jig.

The intermediate layer increases the adhesion between the substrate and the zirconia surface layer or the metal oxide coated layer to improve the durability against the heat cycles, and further reinforces the substrate together with the zirconia surface layer and the metal oxide coated layer to further suppress the appearance of the warp possibly generated in the three-layered jig.

While the material of the intermediate layer is not especially restricted, an alumina single layer, a zirconia-calcia-alumina-yttria intermediate layer or an alumina-calcia-magnesia containing intermediate layer is used.

The substance constituting the zirconia surface layer formed on the intermediate layer is desirably composite oxide of zirconia-calcia-alumina-yttria, or zirconia stabilized with yttria or the like. The zirconia surface layer acting as the surface layer in direct contact with electronic components should not exert ill effects on the electronic components. Accordingly, zirconia partially stabilized or stabilized by yttria, calcia or magnesia, or composite oxide containing zirconia is desirably used. The usable zirconia particles include zirconia stabilized or partially stabilized by $Y_2O_3$ or CaO, and non-stabilized zirconia.

While the phase transformation takes place with the rise of temperature in zirconia, the solid solution of the partially fused-bonding agent (stabilizing agent) "stabilizes" the tetragonal system and the cubic system which are higher temperature phases under ambient temperature.

The zirconia surface layer, the intermediate layer and the metal oxide coated layer can be formed by using the spray coating method, the dip coating method, the pouring method or the application-thermal decomposition method. While the multi-layered structure of the present invention may be wholly calcined at the same time or the respective layers may be separately calcined, the whole calcination at the same time is desirable to balance the stresses and the deformations applied to the top and bottom surfaces of the substrate.

After the alumina intermediate layer is spray-coated on the substrate surface followed by drying, the zirconia surface layer is spray-coated on the intermediate layer followed by drying, for example. Then, after the metal oxide coated layer acting as the bottom layer is spray-coated followed by drying, the multiple layers can be simultaneously calcined. The temperature for calcining the jig is desirably higher than that for actually calcining the electronic component so that the material of the calcining jig is not deteriorated during use. Since the temperature for calcining the electronic component is ordinarily from 1200 to 1400° C., the temperature for calcining the zirconia layer is preferably from 1300 to 1600° C.

In the second embodiment of the fourth invention, the sintering aid made of one or more metal oxides is added to at least one of the zirconia surface layer and the metal oxide coated layer. The sintering aid may be added to the intermediate layer.

The sintering aid can be one or more oxides selected from rare earth metal oxides such as alumina and $Y_2O_3$, transition metal oxides such as $ZrO_2$ and alkaline earth metal oxides such as MgO, and may be composite oxide containing these metal oxides. An amount of the added sintering aid is preferably from 0.1 to 25% in weight with respect to each of the zirconia surface layer, the metal oxide coated layer and the intermediate layer. When the addition amount is smaller, the effect with respect to the sintering is smaller. On the other hand, when excessive, the sintering aid may form a liquid phase which reacts with the electronic component or which may be a cause of peel-off according to circumstance. For example, zirconia aggregate having #100 mesh and zirconia fine particles having an average particle size from 1 to 3 μm are used as the zirconia surface layer, and $Al_2O_3$, $TiO_2$, $La_2O_3$, MgO acting as the sintering aid can be added thereto.

In the third embodiment of the fourth invention, the zirconia layer or the other metal oxide coated layer is formed on the side surface of the substrate in addition to the top and bottom surfaces of the substrate. As describe above, the impurity vapor in the substrate may be contaminated into the electronic component to pollute the electronic component. The above coating of the side surface of the substrate in addition to the top and bottom surfaces can prevent the contamination of the impurities from the substrate almost completely.

Further, in the fourth embodiment of the fourth invention, the metal oxide coated layer on the bottom surface of the three-layered jig is formed to contain no zirconia, or the metal oxide coated layer on the bottom surface is made of a material different from that of the zirconia surface layer of the top surface. Since the bottom surface is not in direct contact with the electronic component, it is not required to have lower reactivity with the electronic component and may be made of a material other than the zirconia. Accordingly, the material can be determined by considering the cost and the adhesion with the substrate without the consideration of the reactivity with the electronic component.

In this manner, in the fourth invention, the jig for calcining the electronic component having the balanced higher strength can be provided because the zirconia surface layer and the metal oxide coated layer formed on the top and bottom surfaces of the substrate balance the stress and the deformation which may be generated on the top and bottom surfaces of the substrate to substantially prevent the generation of the warp, and further the intermediate layer containing the sintering aid increases the adhesion among the intermediate layer-constituting particles and the adhesion strength between the substrate and the zirconia surface layer.

In the fourth invention, the coatings are formed on the top and bottom surfaces of the substrate to prevent the generation of the warp. In addition, the sintering aid contained in one or both of the both layers improves the characteristics such as the sintered ability and the adhesion.

In the jig for calcining the electronic component of the fourth invention, the impurity vapor in the substrate may be contaminated into the electronic component during the calcination to pollute the electronic component. However, as defined in claim 23, the coating of the side surface of the substrate in addition to the top and bottom surfaces can prevent the scattering of the impurities from the substrate and the resultant contamination of the impurities into the electronic component almost completely.

Further, in the fourth invention, the metal oxide coated layer coated on the bottom surface of the substrate is made of a material different from that of the zirconia surface layer of the top surface, thereby determining the material of the metal oxide coated layer by considering the cost and the adhesion with the substrate without the consideration of the reactivity with the electronic component.

The above and other objects, features and advantages of the present invention will be more apparent from the following description.

BEST MODE FOR IMPLEMENTING INVENTION

Figure 1:
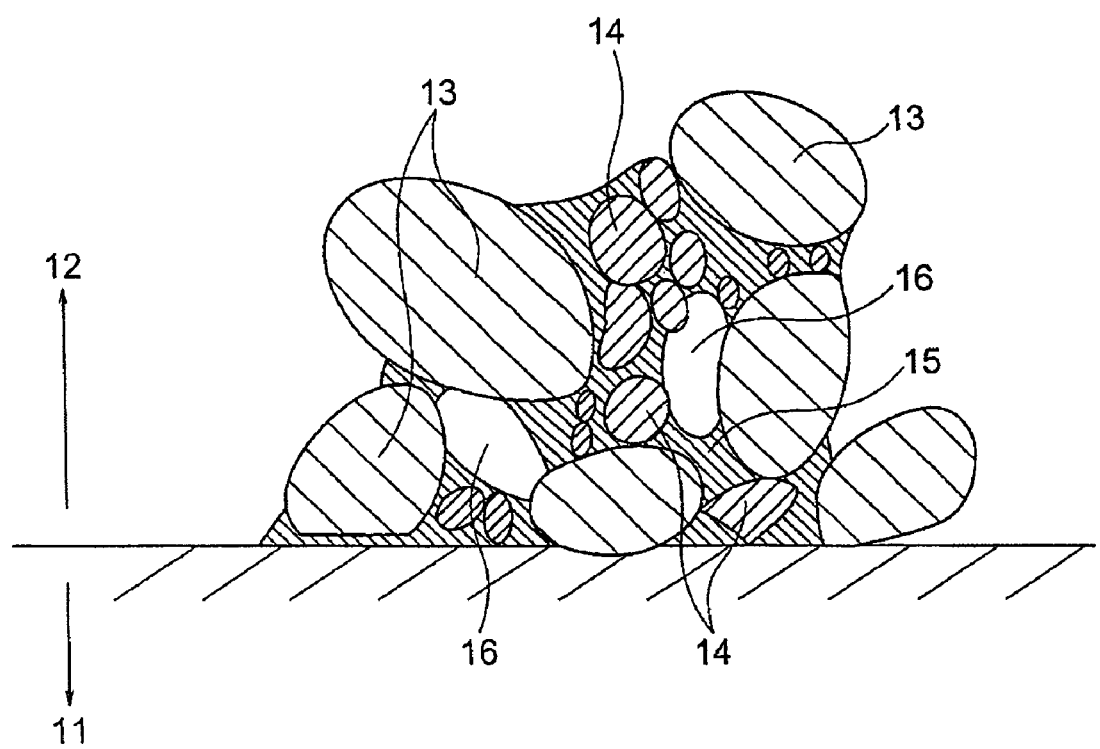
FIG. 1 is a vertical sectional view in part showing one example of a jig for calcining an electronic component in accordance with first, third and fourth inventions.

For the better understanding of the jig for calcining the electronic component having the increased peel-off resistance and wear resistance in accordance with first, third and fourth inventions, a schematic view showing a fine structure of a zirconia layer is exemplified in FIG. 1.

As shown therein, the jig for calcining the electronic component is configured by forming a zirconia layer 12 on a substrate 11 surface. The zirconia in the zirconia layer 12 includes a plenty of coarse zirconia 13 and a plenty of fine zirconia 14, and these zirconia powders 13, 14 are bonded by a crystalline phase 15. The crystalline phase 15 is conjectured to be crystallized by cooling a liquid phase which has been formed by partial melting during the higher temperature calcination. The crystallization is considered to further increase the bondings among the respective zirconia powders. A symbol 16 refers to a pore formed during the cooling of the partially fused-bonding agent.

Figure 2:
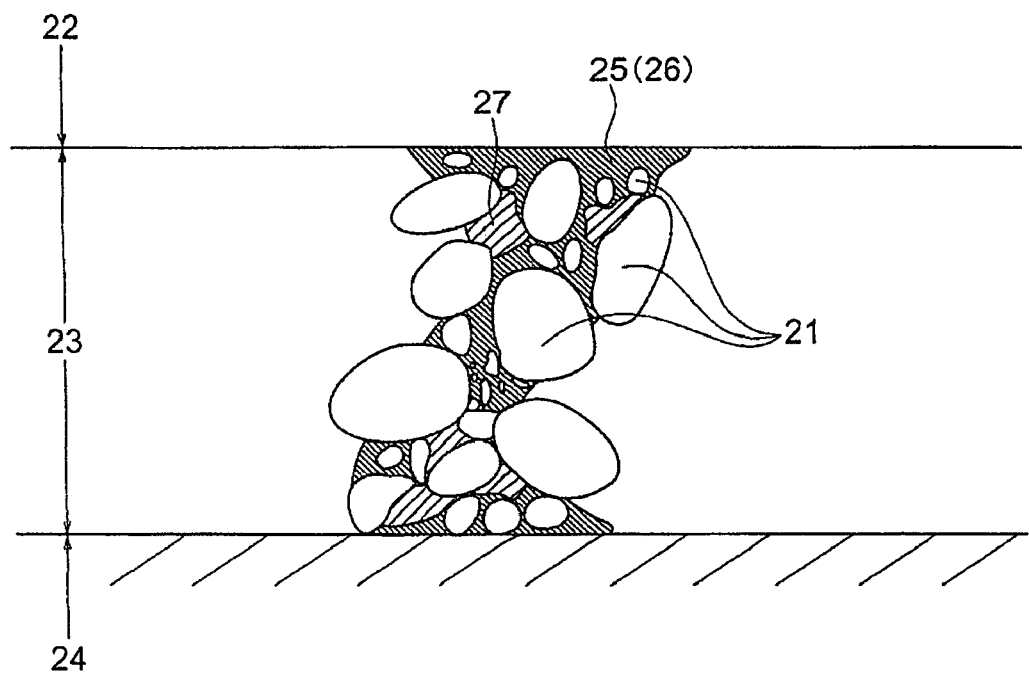
FIG. 2 is a vertical sectional view in part showing one example of a jig for calcining an electronic component in accordance with a second invention.

Then, for the better understanding of the jig for calcining the electronic component having the alumina intermediate layer with the increased peel-off resistance in accordance with the second invention, a schematic view of the alumina intermediate layer is shown in FIG. 2. As shown therein, a reaction between a part of the alumina particles 21 and a sintering aid, and a reaction between the alumina 21 and one or more kinds of the sintering aids strongly bind the alumina particles among one another through a liquid phase. The interfaces between a zirconia surface layer 22 and an alumina intermediate layer 23 and between the alumina intermediate layer 23 and a substrate 24 are bonded by the sintering aid or the sintering aid having a liquid phase 25, and the liquid phase is converted into a crystalline phase to considerably increase the peel-off resistance and to suppress the generation of surface cracks. A symbol 27 refers to a pore formed during the cooling.

Figure 3:
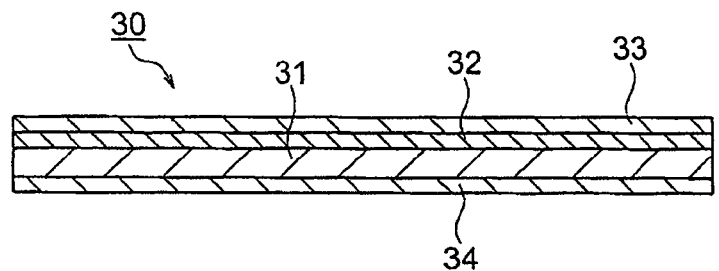
FIG. 3 is a vertical sectional view showing one embodiment of the jig for calcining the electronic component in accordance with the fourth invention.

As shown in FIG. 3, in accordance with an embodiment of the fourth invention, an intermediate layer 32 made of alumina or the like containing a sintering aid is formed on a substrate 31 of a jig 30 for calcining an electronic component, and further, a zirconia surface layer 33 made of zirconia containing a sintering aid is formed on the intermediate layer 32. A metal oxide coated layer 34 made of zirconia or alumina-magnesia spinel containing a sintering aid is formed on the bottom surface of the substrate 31.

The zirconia surface layer 33 and the metal oxide coated layer 34 formed on the top and bottom surfaces of the substrate 31 of the jig 30 balance the stress and the deformation which may be generated on the top and bottom surfaces of the substrate 31 to prevent the occurrence of the warp. Further, the intermediate layer 32 containing the sintering aid increases the adhesion strength between the substrate 31 and the zirconia surface layer 33 to provide the jig having the balanced higher strength.

Figure 4:
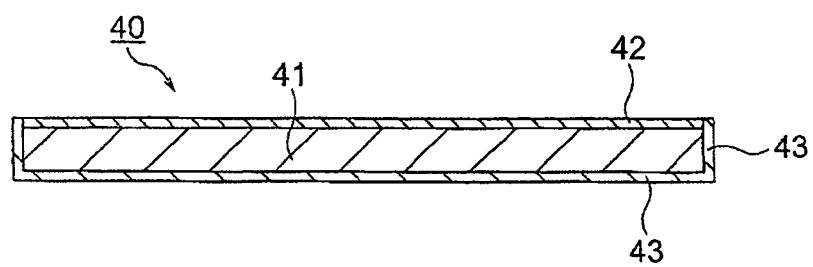
FIG. 4 is a vertical sectional view showing another embodiment.

In FIG. 4 showing another embodiment of a jig 40 for calcining an electronic component, a zirconia surface layer 42 is formed on the surface of a substrate 41, and further a metal oxide coated layer 43 is coated on the bottom surface and the side surface of the substrate 41.

Since all the surfaces of the substrate 41 of the jig 40 are coated with the zirconia surface layer 42 and the metal oxide coated layer 43, no impurities in the substrate 41 scatter into the electronic components for contamination during calcination, thereby providing calcined electronic components having a higher purity. The addition of a sintering aid into the zirconia surface layer 42 and the metal oxide coated layer 43 can contribute to the increase of the sintered ability and the strength.

Figure 5:
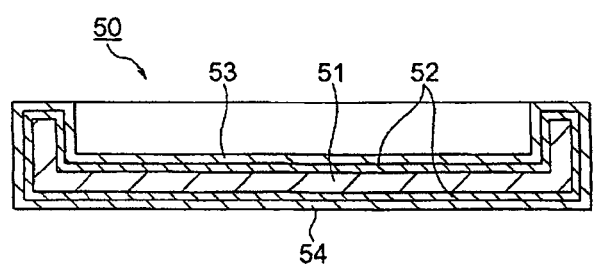
FIG. 5 is a vertical sectional view showing a further embodiment.

In FIG. 5 showing a further embodiment, a jig 50 for calcining an electronic component is a box-like saggar having an open top. An intermediate layer 52 is formed on the top and bottom surfaces of a substrate 51. A zirconia surface layer 53 is coated on the intermediate layer 52 on the top surface, and a metal oxide coated layer 54 is coated on the intermediate layer 52 on the bottom surface.

Since the top and bottom surfaces of the substrate 51 of the jig 50 are coated with the zirconia surface layer 52 and the metal oxide coated layer 54 through the intermediate layer 52, the jig for calcining the electronic component having the balanced strength including the adhesion of the top and bottom surfaces. The addition of a sintering aid into the zirconia surface layer 53, the metal oxide coated layer 54 and the intermediate layer 52 can contribute to the further increase of the sintered ability and the strength.

Then, Examples of the jig for calcining the electronic component in accordance with the present invention will be described. However, the present invention shall not be deemed to be restricted thereto.

EXAMPLE 1

An alumina-mullite substrate having about 10% in weight of a silica component was used as a substrate. As a main component of a zirconia layer, 70% in weight of yttria-stabilized zirconia having an average particle size of 80 μm, 20% in weight of yttria-stabilized zirconia having an average particle size of 3 μm and 7% in weight of calcia-stabilized zirconia were used. A mixture was prepared by adding 3% in weight of aluminum oxide acting as metal oxide and having an average particle size of 1 μm to the above oxides.

As an impurity, 0.5% in weight of $SnO_2$ with respect to the above powders was added. These were uniformly mixed with a ball mill, and then water and polyvinyl alcohol acting as a binder were added thereto for making slurry. The slurry was spray-coated on the surface of the above substrate. The thickness of the obtained zirconia layer was about 150 μm. After being dried at 100° C., the spray-coated substrate was held from 1400 to 1600° C. for two hours to obtain a jig for calcining an electronic component having the calcined zirconia layer.

In order to investigate the peel-off resistance and the wear resistance of the zirconia layer of the jig for calcining the electronic component, the jig was rapidly heated from 500° C. to 1300° C. for three hours, then was rapidly cooled from 1300° C. to 500° C. for three hours. This heat cycle was repeated 30 times. After 30 heat cycles, a wear resistance test was conducted on the zirconia layer which was not peeled off.

In the wear resistance test, after a specified load was applied to the above specimen of the jig on SiC abrasive paper (the specimen was moved on the paper for a specified number of times for a specified distance), a weight reduction was measured. A wear amount is shown as a relative value when the wear amount of Comparative Example 2 is 1. When, for example, the wear amount is half of that of Comparative Example 2, it is 0.5. The results are shown in Table 1.

EXAMPLE 2

A mixture was obtained in the same manner as that of Example 1 except that, as the main component of the zirconia layer, 90% in weight of yttria-stabilized zirconia having an average particle size of 70 μm and 5% in weight of calcia-stabilized zirconia having an average particle size of 3 μm were used, and, as the metal oxides, 2% in weight of lanthanum oxide and 3% in weight of barium oxide both having average particle sizes of 1 μm were added. These were uniformly mixed with a ball mill, and then water and polyvinyl alcohol acting as a binder were added thereto for making slurry. The slurry was spray-coated on the surface of the above substrate. After being dried at 100° C., the spray-coated substrate was held from 1400 to 1600° C. for two hours to obtain a jig for calcining an electronic component having the calcined zirconia layer. The peel-off resistance and the wear resistance of the zirconia layer of the obtained jig were investigated. The results are shown in Table 1.

EXAMPLE 3

A mixture was obtained in the same manner as that of Example 1 except that, as the main component of the zirconia layer, 70% in weight of yttria-stabilized zirconia having an average particle size of 100 μm and 26% in weight of yttria-stabilized zirconia having an average particle size of 1 μm were used, and, as the metal oxides, 1% in weight of calcium oxide and 3% in weight of titanium oxide both having average particle sizes of 1 μm were added. These were uniformly mixed with a ball mill, and then water and polyvinyl alcohol acting as a binder were added thereto for making slurry. The slurry was spray-coated on the surface of the above substrate. After being dried at 100° C., the spray-coated substrate was held from 1400 to 1600° C. for two hours to obtain a jig for calcining an electronic component having the calcined zirconia layer. The peel-off resistance and the wear resistance of the zirconia layer of the obtained jig were investigated. The results are shown in Table 1.

EXAMPLE 4

A mixture was obtained in the same manner as that of Example 1 except that, as the main component of the zirconia layer, 80% in weight of yttria-stabilized zirconia having an average particle size of 150 μm and 15% in weight of non-stabilized zirconia having an average particle size of 1 μm were used, and, as the metal oxides, 2% in weight of calcium oxide, 2% in weight of yttrium oxide and 1% in weight of niobium oxide all having average particle sizes of 1 μm were added. These were uniformly mixed with a ball mill, and then water and polyvinyl alcohol acting as a binder were added thereto for making slurry. The slurry was spray-coated on the surface of the above substrate. After being dried at 100° C., the spray-coated substrate was held from 1400 to 1600° C. for two hours to obtain a jig for calcining an electronic component having the calcined zirconia layer. The peel-off resistance and the wear resistance of the zirconia layer of the obtained jig were investigated. The results are shown in Table 1.

EXAMPLE 5

A mixture was obtained in the same manner as that of Example 1 except that, as the main component of the zirconia layer, 60% in weight of yttria-stabilized zirconia having an average particle size of 100 μm and 35% in weight of yttria-stabilized zirconia having an average particle size of 5 μm were used, and, as the metal oxides, 2% in weight of strontium oxide and 3% in weight of barium titanate both having average particle sizes of 1 μm were added. As an impurity, 0.5% in weight of $Bi_2O_3$ with respect to the above powders was added. These were uniformly mixed with a ball mill, and then water and polyvinyl alcohol acting as a binder were added thereto for making slurry. The slurry was spray-coated on the surface of the above substrate. After being dried at 100° C., the spray-coated substrate was held from 1400 to 1600° C. for two hours to obtain a jig for calcining an electronic component having the calcined zirconia layer. The peel-off resistance and the wear resistance of the zirconia layer of the obtained jig were investigated. The results are shown in Table 1.

COMPARATIVE EXAMPLE 1

A mixture was obtained in the same manner as that of Example 1 except that, as the main component of the zirconia layer, 20% in weight of yttria-stabilized zirconia having an average particle size of 150 μm and 50% in weight of non-stabilized zirconia having an average particle size of 5 μm were used, and, as the metal oxide, 30% in weight of barium oxide having an average particle size of 1 μm was added. These were uniformly mixed with a ball mill, and then water and polyvinyl alcohol acting as a binder were added thereto for making slurry. The slurry was spray-coated on the surface of the above substrate. After being dried at 100° C., the spray-coated substrate was held from 1400 to 1600° C. for two hours to obtain a jig for calcining an electronic component having the calcined zirconia layer. The peel-off resistance and the wear resistance of the zirconia layer of the obtained jig were investigated. The results are shown in Table 1.

COMPARATIVE EXAMPLE 2

A mixture was obtained in the same manner as that of Example 1 except that, as the main component of the zirconia layer, 70% in weight of yttria-stabilized zirconia having an average particle size of 100 μm and 30% in weight of yttria-stabilized zirconia having an average particle size of 1 μm were used. These were uniformly mixed with a ball mill, and then water and polyvinyl alcohol acting as a binder were added thereto for making slurry. The slurry was spray-coated on the surface of the above substrate. After being dried at 100° C., the spray-coated substrate was held from 1400 to 1600° C. for two hours to obtain a jig for calcining an electronic component having the calcined zirconia layer. The peel-off resistance and the wear resistance of the zirconia layer of the obtained jig were investigated. The results are shown in Table 1.

COMPARATIVE EXAMPLE 3

A mixture was obtained in the same manner as that of Example 1 except that, as the main component of the zirconia layer, 50% in weight of yttria-stabilized zirconia having an average particle size of 100 μm and 50% in weight of non-stabilized zirconia having an average particle size of 1 μm were used, and, as the impurity, 8% in weight of silicon oxide was added. These were uniformly mixed with a ball mill, and then water and polyvinyl alcohol acting as a binder were added thereto for making slurry. The slurry was spray-coated on the surface of the above substrate. After being dried at 100° C., the spray-coated substrate was held from 1400 to 1600° C. for two hours to obtain a jig for calcining an electronic component having the calcined zirconia layer. The peel-off resistance and the wear resistance of the zirconia layer of the obtained jig were investigated. The results are shown in Table 1.

TABLE 1

| | Main component of zirconia layer (wt %, average particle size μm) | Metal Oxide (wt %, average particle size was 1 μm) | Impurity (wt %) | Peel-off Resistance | Wear Resistance |
|---|---|---|---|---|---|
| Example | | | | | |
| 1 | Y-stabilized (70%, 80 μm) Y-stabilized (20%, 3 μm) C-stabilized (7%, 3 μm) | $Al_2O_3$ (3%) | $SnO_2$ (0.5%) | 30 cycles or more | 0.14 |
| 2 | Y-stabilized (90%, 70 μm) C-stabilized (5%, 3 μm) | $La_2O_3$ (2%) BaO (3%) | | 30 cycles or more | 0.20 |
| 3 | Y-stabilized (70%, 100 μm) Y-stabilized (26%, 1 μm) | CaO (1%) $Ti_2O_3$ (3%) | | 30 cycles or more | 0.16 |
| 4 | Y-stabilized (80%, 150 μm) Non-stabilized (15%, 1 μm) | CaO (2%) $Yi_2O_3$ (2%) $Nb_2O_5$ (1%) | | 30 cycles or more | 0.32 |
| 5 | Y-stabilized (60%, 100 μm) Y-stabilized (35%, 5 μm) | SrO (2%) $BaTiO_3$ (3%) | $Bi_2O_3$ (0.5%) | 30 cycles or more | 0.53 |
| Comparative Example | | | | | |
| 1 | Y-stabilized (20%, 150 μm) Non-stabilized (50%, 5 μm) | BaO (30%) | | Peel-off after 1 cycle | |
| 2 | Y-stabilized (70%, 100 μm) Y-stabilized (30%, 1 μm) | | | 30 cycles or more | 1.0 |
| 3 | Y-stabilized (50%, 100 μm) Non-stabilized (30%, 1 μm) | | $SiO_2$ (8%) | Peel-off after 5 cycles | |

EXAMPLE 6

An alumina-mullite substrate having up to about 10% in weight of a silica component was used as a substrate. After 97% in weight of alumina having an average particle size of about 40 μm and 5% in weight of barium oxide having an average particle size of 1 μm were weighed, 0.5% in weight of silicon oxide acting as an impurity was added to the weighed material. Then, the mixture was uniformly mixed with a ball mill, and then water and polyvinyl alcohol acting as a binder were added thereto for making slurry.

The slurry was spray-coated on the surface of the above substrate and dried at 100° C. Then, on the surface of this intermediate layer, a $Y_2O_3$-stabilized $ZrO_2$ surface layer was spray-coated ands dried at about 100° C. The thicknesses of the intermediate layer and the surface layer were 100 and 150 μm, respectively.

In order to investigate the peel-off resistance and the occurrence of cracks of the zirconia layer of the jig for calcining the electronic component, the jig was rapidly heated from 500° C. to 1300° C. for three hours, then was rapidly cooled from 1300° C. to 500° C. for three hours. This heat cycle was repeated 50 times. After 50 heat cycles, the occurrence of the peel-off was examined, and the generation of the cracks was observed with a microscope. The results are shown in Table 2.

EXAMPLE 7

A jig for calcining an electronic component having an alumina intermediate layer and a zirconia surface layer was obtained in the same manner as that of Example 6 except that 97% in weight of alumina having an average particle size of about 40 μm and 5% in weight of barium titanate having an average particle size of 1 μm were weighed, and 0.5% in weight of zinc oxide acting as an impurity was added thereto. The peel-off resistance and the occurrence of cracks of the zirconia layer of the obtained jig were investigated. The results are shown in Table 2.

EXAMPLE 8

A jig for calcining an electronic component having an alumina intermediate layer and a zirconia surface layer was obtained in the same manner as that of Example 6 except that 96% in weight of alumina having an average particle size of about 40 μm, 3% in weight of lanthanum oxide having an average particle size of 1 μm and 1% in weight of niobium oxide were weighed. The peel-off resistance and the occurrence of cracks of the zirconia layer of the obtained jig were investigated. The results are shown in Table 2.

EXAMPLE 9

A jig for calcining an electronic component having an alumina intermediate layer and a zirconia surface layer was obtained in the same manner as that of Example 6 except that 94% in weight of alumina having an average particle size of about 40 μm, 5% in weight of aluminum titanate having an average particle size of 1 μm and 1% in weight of cerium oxide were weighed. The peel-off resistance and the occurrence of cracks of the zirconia layer of the obtained jig were investigated. The results are shown in Table 2.

EXAMPLE 10

A jig for calcining an electronic component having an alumina intermediate layer and a zirconia surface layer was obtained in the same manner as that of Example 6 except that 95% in weight of alumina having an average particle size of about 40 μm, 2% in weight of titanium oxide having an average particle size of 1 μm, 1% in weight of iron oxide and 2% in weight of barium oxide were weighed. The peel-off resistance and the occurrence of cracks of the zirconia layer of the obtained jig were investigated. The results are shown in Table 2.

COMPARATIVE EXAMPLE 4

A jig for calcining an electronic component having an alumina intermediate layer and a zirconia surface layer was obtained in the same manner as that of Example 6 except that 100% in weight of alumina having an average particle size of about 40 μm was weighed. The peel-off resistance and the occurrence of cracks of the zirconia layer of the obtained jig were investigated. The results are shown in Table 2.

COMPARATIVE EXAMPLE 5

A jig for calcining an electronic component having an alumina intermediate layer and a zirconia surface layer was obtained in the same manner as that of Example 6 except that 60% in weight of alumina having an average particle size of about 40 μm and 40% in weight of barium oxide having an average particle size of 1 μm were weighed. The peel-off resistance and the occurrence of cracks of the zirconia layer of the obtained jig were investigated. The results are shown in Table 2.

COMPARATIVE EXAMPLE 6

A jig for calcining an electronic component having an alumina intermediate layer and a zirconia surface layer was obtained in the same manner as that of Example 6 except that 90% in weight of alumina having an average particle size of about 40 μm was weighed, and 10% in weight of bismuth oxide acting as an impurity was added. The peel-off resistance and the occurrence of cracks of the zirconia layer of the obtained jig were investigated. The results are shown in Table 2.

TABLE 2

| | Aluminum intermediate layer (wt %) | Metal Oxide (wt %) | Impurity (wt %) | Zirconia surface layer | Peel-off resistance | Existence of cracks on surface layer |
|---|---|---|---|---|---|---|
| Example | | | | | | |
| 6 | 97% | BaO: 3% | $SiO_2$: 0.5% | $Y_2O_3$-stabilized $ZrO_2$ | 50 cycles or more | None |
| 7 | 97% | $BaTiO_3$: 3% | ZnO: 2% | $Y_2O_3$-stabilized $ZrO_2$ + non-stabilized $ZrO_2$ | 50 cycles or more | None |
| 8 | 96% | $La_2O_3$: 3% $Nb_2O_5$: 1% | | $Y_2O_3$-stabilized $ZrO_2$ | 50 cycles or more | None |
| 9 | 94% | $Al_2TiO_5$: 5% $CeO_2$: 1% | | $Y_2O_3$-stabilized $ZrO_2$ | 50 cycles or more | None |
| 10 | 95% | $TiO_2$: 2% $Fe_2O_3$: 1% BaO: 2% | | $Y_2O_3$-stabilized $ZrO_2$ + non-stabilized $ZrO_2$ | 50 cycles or more | None |
| Comparative Example | | | | | | |
| 4 | 100% | | | $Y_2O_3$-stabilized $ZrO_2$ | 16 cycles | Existed |

TABLE 2-continued

| | Aluminum intermediate layer (wt %) | Metal Oxide (wt %) | Impurity (wt %) | Zirconia surface layer | Peel-off resistance | Existence of cracks on surface layer |
|---|---|---|---|---|---|---|
| 5 | 60% | BaO: 40% | | $Y_2O_3$-stabilized $ZrO_2$ + non-stabilized $ZrO_2$ | 1 cycle | Existed |
| 6 | 100% | | $Bi_2O_3$: 10% | $Y_2O_3$-stabilized $ZrO_2$ + non-stabilized $ZrO_2$ | Film was melted after 1 cycle | |

EXAMPLE 11

An alumina-mullite substrate having up to about 10% in weight of a silica component was used as a substrate.

Then, 70% in weight of yttria-stabilized zirconia having an average particle size of about 80 μm; 20% in weight of yttria-stabilized zirconia having an average particle size of about 3 μm and 5% in weight of calcia-stabilized zirconia having an average particle size of about 3 μm; and 5% in weight of alumina having an average particle size of about 1 μm were prepared acting as coarse zirconia, fine zirconia and a partially fused-bonding agent, respectively.

These were uniformly mixed with a ball mill, and then water and polyvinyl alcohol acting as a binder were added thereto for making slurry. The slurry was spray-coated on the surface of the above substrate. The thickness of the obtained zirconia layer was about 150 μm. After being dried at 100° C., the spray-coated substrate was held from 1400 to 1600° C. for two hours to obtain a jig for calcining an electronic component having the calcined zirconia layer. In the zirconia layer of the obtained jig, less than 1% in weight of an impurity (zinc oxide) was contaminated.

In order to investigate the peel-off resistance and the wear resistance of the zirconia layer of the jig for calcining the electronic component, the jig was rapidly heated from 500° C. to 1300° C. for three hours, then was rapidly cooled from 1300° C. to 500° C. for three hours. This heat cycle was repeated 30 times. After 30 heat cycles, a wear resistance test was conducted to the zirconia layers which were not peeled off.

In the wear resistance test, after a specified load was applied to the above specimen of the jig on SiC abrasive paper (the specimen was moved on the paper for a specified number of time for a specified distance), a weight reduction (wear amount) was measured. The wear amount is shown in Table 3. The wear amount was expressed as a relative value when the wear amount of Comparative Example 8 is 1.

EXAMPLE 12

A jig for calcining an electronic component was obtained in the same manner as that of Example 11 except that 91% in weight of yttria-stabilized zirconia having an average particle size of about 70 μm; 3% in weight of calcia-stabilized zirconia having an average particle size of about 3 μm; and a mixture of 3% in weight of alumina having an average particle size of about 1 μm and 3% in weight of titania having an average particle size of about 1 μm were used acting as coarse zirconia, fine zirconia and a partially fused-bonding agent, respectively. No impurities were observed in the zirconia layer.

While no peel-off was observed after the heat cycles similarly to Example 11 were repeated 30 times, the wear resistance test was conducted to the zirconia layer. The wear resistance index was 0.20 as shown in Table 3.

EXAMPLE 13

A jig for calcining an electronic component was obtained in the same manner as that of Example 11 except that 70% in weight of yttria-stabilized zirconia having an average particle size of about 100 μm; 15% in weight of yttria-stabilized zirconia having an average particle size of about 1 μm; and a mixture of 5% in weight of lanthania ($La_2O_3$) having an average particle size of about 1 μm and 10% in weight of $Al_2O_3$—MgO spinel having an average particle size of about 1 μm were used acting as coarse zirconia, fine zirconia and a partially fused-bonding agent, respectively. No impurities were observed in the zirconia layer.

While no peel-off was observed after the heat cycles similarly to Example 11 were repeated 30 times, the wear resistance test was conducted to the zirconia layer. The wear resistance index was 0.22 as shown in Table 3.

EXAMPLE 14

A jig for calcining an electronic component was obtained in the same manner as that of Example 11 except that 80% in weight of yttria-stabilized zirconia having an average particle size of about 150 μm; 10% in weight of non-stabilized zirconia having an average particle size of about 1 μm; and a mixture of 5% in weight of calcia having an average particle size of about 1 μm and 5% in weight of magnesia having an average particle size of about 1 μm were used acting as coarse zirconia, fine zirconia and a partially fused-bonding agent, respectively. In the zirconia layer of the obtained jig, less than 1% in weight of an impurity (bismuth oxide) was contaminated.

While no peel-off was observed after the heat cycles similarly to Example 11 were repeated 30 times, the wear resistance test was conducted to the zirconia layer. The wear resistance index was 0.31 as shown in Table 3.

EXAMPLE 15

A jig for calcining an electronic component was obtained in the same manner as that of Example 11 except that 60% in weight of calcia-stabilized zirconia having an average particle size of about 100 μm; 30% in weight of yttria-stabilized zirconia having an average particle size of about 5 μm; and a mixture of 3% in weight of strontia (SrO) having an average particle size of about 1 μm, 2% in weight of barium titanate (TiBaO$_3$) having an average particle size of about 1 μm and 5% in weight of yttria having an average particle size of about 1 μm were used acting as coarse zirconia, fine zirconia and a partially fused-bonding agent, respectively. In the zirconia layer, no impurities were observed.

While no peel-off was observed after the heat cycles similarly to Example 11 were repeated 30 times, the wear resistance test was conducted to the zirconia layer. The wear resistance index was 0.18 as shown in Table 3.

COMPARATIVE EXAMPLE 7

A jig for calcining an electronic component was obtained in the same manner as that of Example 11 except that 50% in weight of yttria-stabilized zirconia having an average particle size of about 150 μm and 50% in weight of non-stabilized zirconia having an average particle size of about 5 μm were used acting as coarse zirconia and fine zirconia, respectively, and no partially fused-bonding agent was used.

The zirconia layer was peeled off after the heat cycles similarly to Example 11 were repeated 5 times.

COMPARATIVE EXAMPLE 8

A jig for calcining an electronic component was obtained in the same manner as that of Example 11 except that 70% in weight of yttria-stabilized zirconia having an average particle size of about 100 μm and 30% in weight of yttria-stabilized zirconia having an average particle size of about 1 μm were used acting as coarse zirconia and fine zirconia, respectively, and no partially fused-bonding agent was used.

No peel-off was observed after the heat cycles similarly to Example 11 were repeated 30 times. However, as a result of the wear test, the grains of the zirconia layer were easily removed so that the jig was not used for its purpose.

TABLE 3

| | Main component of zirconia layer (wt %, average particle size μm) | partially fused bonding agent (wt %, average particle size μm) | Impurity (wt %) | Peel-off Resistance | Wear Resistance |
|---|---|---|---|---|---|
| Example | | | | | |
| 11 | Y-stabilized (70%, 80 μm) Y-stabilized (20%, 3 μm) C-stabilized (5%, 3 μm) | Alumina (5%, 1 μm) | ZnO (1% or less) | 30 cycles or more | 0.14 |
| 12 | Y-stabilized (91%, 70 μm) C-stabilized (3%, 3 μm) | Alumina (3%, 1 μm) Titania (3%, 1 μm) | — | 30 cycles or more | 0.20 |
| 13 | Y-stabilized (70%, 100 μm) Y-stabilized (156%, 1 μm) | Lanthania (5%, 1 μm) Alumina-Magnesia Spinel (10%, 1 μm) | — | 30 cycles or more | 0.22 |
| 14 | Y-stabilized (80%, 150 μm) Non-stabilized (10%, 1 μm) | Calcia (5%, 1 μm) Magnesia (5%, 1 μm) | Bi$_2$O$_3$ (1% or less) | 30 cycles or more | 0.31 |
| 15 | C-stabilized (62%, 100 μm) Y-stabilized (30%, 5 μm) | Strontia (3%, 1 μm) Yttria (5%, 1 μm) | — | 30 cycles or more | 0.18 |
| Comparative Example | | | | | |
| 7 | Y-stabilized (50%, 150 μm) Non-stabilized (50%, 5 μm) | — | — | Peel-off after 5 cycles | — |
| 8 | Y-stabilized (70%, 100 μm) Y-stabilized (30%, 1 μm) | — | — | 30 cycles or more | 1.0 |

EXAMPLE 16

Water and polyvinyl alcohol acting as a binder were added to alumina having an average particle size of 30 μm to provide slurry. The slurry was spray-coated on the substrate of Example 11 and dried at 100° C. to fabricate an intermediate layer. A zirconia layer was formed on the intermediate layer similarly to Example 11 to provide a jig for calcining an electronic component. The total thickness of the zirconia layer and the intermediate layer after the calcination was about 250 μm.

While no peel-off was observed after the heat cycles similarly to Example 11 were repeated 30 times, the wear resistance test was conducted to the zirconia layer. The wear resistance index was 0.12. The results are shown in Table 4.

TABLE 4

| Example | Main Component of $ZrO_2$ layer (wt %, average particle size μm) | Partially fused-bonding agent (wt %, average particle size μm) | Intermediate Layer (material, thickness) | Impurity (wt %) | Peel-off Resistance | Wear Resistance |
| --- | --- | --- | --- | --- | --- | --- |
| 16 | Y-stabilized (70%, 80 μm) Y-stabilized (20%, 3 μm) C-stabilized (5%, 3 μm) | Alumina (5%, 1 μm) | Alumina 250 μm | ZnO (less than 1%) | 30 cycles or more | 0.12 |

EXAMPLE 17

An alumina-mullite substrate (150 mm×150 mm×3 mm in thickness) having up to about 10% in weight of a silica component was used as a substrate.

A mixture for a material of a zirconia surface layer was prepared containing 70% in weight of yttria-stabilized zirconia having #100 mesh and 25% in weight of yttria-stabilized zirconia having an average particle size of about 3 μm, to which alumina (2% in weight), yttria (1% in weight) and calcia (2% in weight) having a total amount of 5% weight and acting as a sintering aid were added.

The mixture was uniformly mixed with a ball mill, and then water and polyvinyl alcohol acting as a binder were added thereto for making slurry. The slurry was spray-coated on the surface of the above substrate and dried at 100° C. Then, the same slurry as that used for coating the zirconia surface layer was spray-coated on the bottom surface of the substrate and dried at 100° C.

The substrate having the thus obtained coatings was held at 1500° C. for two hours to provide a jig for calcining an electronic component. The thickness of the zirconia surface layer after the calcination was about 250 μm and the thickness of the metal oxide coated layer on the bottom surface was about 250 μm.

Figure 6:
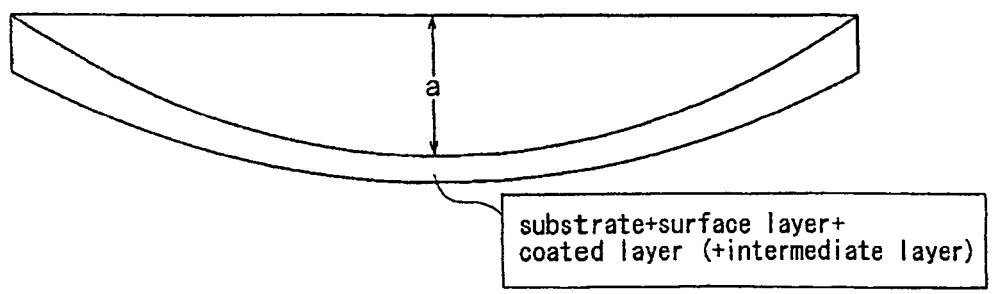
FIG. 6 is a view defining a warp in the embodiment of the fourth invention.

When a warp ["a" shown in FIG. 6 (intersecting point of diagonal lines) of the obtained jig was measured, no warp was substantially generated. In order to investigate the peel-off resistance, the jig was rapidly heated from 500° C. to 1300° C. for three hours, then was rapidly cooled from 1300° C. to 500° C. for three hours. This heat cycle was repeated 50 times. Neither cracks nor peel-off was observed in the zirconia surface layer and the metal oxide coated layer. No warp was observed even after the heat cycles. The results are shown in Table 5.

EXAMPLE 18

After the weighing of 97% in weight of alumina having an average particle size of about 30 μm and 3% in weight of calcia having an average particle size of about 1 μm acting as a sintering aid, these were uniformly mixed with a ball mill, and water and polyvinyl alcohol acting as a binder were added thereto for making slurry. The slurry was spray-coated on the surface of the substrate of Example 1 and dried at 100° C. to form an intermediate layer. Then, the zirconia surface layer the same as that of Example 17 was formed on the surface of the intermediate layer, and the metal oxide coated layer the same as that of Example 17 was formed on the bottom surface of the substrate in accordance with the same conditions of Example 17.

The thicknesses of the zirconia surface layer, the metal oxide coated layer and the intermediate layer were about 150 μm, about 200 μm and about 100 μm.

The evaluation of the obtained jig similarly to Example 17 revealed that no warp was generated, and the warp, the cracks and the peel-off after the heat cycles were not observed. The results are shown in Table 5.

EXAMPLE 19

A jig for calcining an electronic component was obtained in the same manner as that of Example 17 except that alumina (2% in weight), yttria (1% in weight) and magnesia (2% in weight) having a total amount of 5% in weight was used as a sintering aid for a zirconia surface layer, and alumina particles having an average particle size of about 30 μm were used a metal oxide coated layer on a bottom surface.

The thicknesses of the zirconia surface layer and the metal oxide coated layer after the calcination were about 200 μm and about 70 μm, respectively.

The evaluation of the obtained jig similarly to Example 17 revealed that no warp was generated, and the warp, the cracks and the peel-off after the heat cycles were not observed. The results are shown in Table 5.

EXAMPLE 20

A jig for calcining an electronic component was obtained in the same manner as that of Example 19 except that alumina-magnesia spinel particles having an average particle size of about 30 μm were used as the bottom-side metal oxide coated layer.

The thicknesses of the zirconia surface layer and the metal oxide coated layer after the calcination were about 200 μm and about 100 μm, respectively.

The evaluation of the obtained jig similarly to Example 17 revealed that no warp was generated, and the warp, the cracks and the peel-off after the heat cycles were not observed. The results are shown in Table 5.

EXAMPLE 21

A jig for calcining an electronic component was obtained in the same manner as that of Example 18 except that the intermediate layer the same as that between the substrate and the zirconia surface layer was also formed between the substrate and the metal oxide coated layer. Both of the thicknesses of the zirconia surface layer and the metal oxide coated layer were 150 µm, and both of the thicknesses of the two intermediate layers were 100 µm.

The evaluation of the obtained jig similarly to Example 17 revealed that no warp was generated, and the warp, the cracks and the peel-off after the heat cycles were not observed. The results are shown in Table 5.

COMPARATIVE EXAMPLE 9

As a zirconia surface layer, 75% in weight of yttria-stabilized zirconia having #100 mesh and 25% in weight of non-stabilized zirconia having an average particle size of 3 µm were used. A jig for calcining an electronic component was obtained in the same manner as that of Example 17 except that a metal oxide coated layer on a bottom surface was not formed and a sintering aid was not used. The thickness of the zirconia surface layer was 250 µm.

The evaluation of the obtained jig similarly to Example 17 revealed that the warp of about 1 mm was generated after the calcination, and the layer was peeled off after the heat cycles of 32 times. The results are shown in Table 5.

COMPARATIVE EXAMPLE 10

A jig for calcining an electronic component was obtained in the same manner as that of Example 18 except that a metal oxide coated layer on a bottom surface was not formed. The thickness of the zirconia surface layer was 500 µm.

The evaluation of the obtained jig similarly to Example 17 revealed that the warp of about 1.5 mm was generated after the calcination, and the cracks were generated in the layer after the heat cycles of 10 times. The results are shown in Table 5.

TABLE 5

| | Zirconia Surface Layer (wt %, mesh or average particle size) | Sintering Aid of Surface layer (wt %) | Thickness of Surface Layer (µm) | Aluminum Intermediate Layer (wt %, average particle size) | Sintering Aid of Intermediate Layer (wt %) | Thickness of Intermediate Layer of Top Surface (µm) | Bottom Surface Layer (average particle size) | Thickness of Bottom Surface Layer (µm) | Warp of Substrate After Calcination | Warp or the like of the Substrate After Thermal Cycles of 50 times |
|---|---|---|---|---|---|---|---|---|---|---|
| Example 17 | Y$_2$O$_3$-stabilized (70%, #100 mesh) Non-stabilized (25%, 3 µm) | Al$_2$O$_3$ (2) Y$_2$O$_3$ (1) CaO (2) | 250 | None | | | same as top surface layer | 250 | None | Warp, peel-off and crack were absent |
| Example 18 | Y$_2$O$_3$-stabilized (70%, #100 mesh) Non-stabilized (25%, 3 µm) | Al$_2$O$_3$ (2) Y$_2$O$_3$ (1) CaO (2) | 150 | 97% 30 µm | CaO: 3% | 100 | same as top surface layer | 200 | None | Warp, peel-off and crack were absent |
| Example 19 | Y$_2$O$_3$-stabilized (70%, #100 mesh) Non-stabilized (25%, 3 µm) | Al$_2$O$_3$ (2) Y$_2$O$_3$ (1) MgO (2) | 200 | None | | | alumina: 30 µm | 70 | None | Warp, peel-off and crack were absent |
| Example 20 | Y$_2$O$_3$-stabilized (70%, #100 mesh) Non-stabilized (25%, 3 µm) | Al$_2$O$_3$ (2) Y$_2$O$_3$ (1) MgO (2) | 200 | None | | | alumina-magnesia spinel: 30 µm | 100 | None | Warp, peel-off and crack were absent |
| Example 21 | Y$_2$O$_3$-stabilized (70%, #100 mesh) Non-stabilized (25%, 3 µm) | Al$_2$O$_3$ (2) Y$_2$O$_3$ (1) CaO (2) | 150 | 97% 30 µm | CaO: 3% | 100 | same as top surface layer | 150 | None | Warp, peel-off and crack were absent |
| Comparative Example 9 | Y$_2$O$_3$-stabilized (75%, #100 mesh) Non-stabilized (25%, 3 µm) | None | 250 | None | | | None | | warp of about 1 mm | Peel-off after 32 cycles |
| Comparative Example 10 | Y$_2$O$_3$-stabilized (70%, #100 mesh) Non-stabilized (25%, 3 µm) | Al$_2$O$_3$ (2) Y$_2$O$_3$ (1) CaO (2) | 500 | 97% 30 µm | CaO: 3% | 250 | None | | warp of about 1.5 mm | Crack after 10 cycles |

(*) In Example 21, the intermediate layer the same as that formed between the surface layer and the substrate was formed between the substrate and the bottom surface layer.

Since the above embodiments are described only for examples, the present invention is not limited to the above embodiments and various modifications or alterations can be easily made therefrom by those skilled in the art without departing from the scope of the present invention.

The invention claimed is:

1. A jig for calcining an electronic component, the jig comprising:
   a substrate;
   a zirconia surface layer of a first material formed at least on a top surface of the substrate;
   a metal oxide coated layer of a second material formed at least on a bottom surface of the substrate; and
   an intermediate layer formed between the substrate and one of the zirconia surface layer and the metal oxide coated layer,
   wherein a thickness ratio of the zirconia surface layer to the metal oxide coated layer is from 3:4 to 20:7, and
   wherein a particle size of the metal oxide is from 0.1 to 100 µm.

2. The jig of claim 1, wherein the intermediate layer includes a sintering aid comprising at least one metal oxide.

3. The jig of claim 1, wherein at least one of the zirconia surface layer and the metal oxide coated layer includes a sintering aid comprising at least one metal oxide.

4. The jig of claim 1, wherein at least one of the zirconia surface layer and the metal oxide coated layer includes a sintering aid comprising a composite metal oxide selected from the group consisting of alumina, rare earth oxides, transition metal oxides, and alkaline earth metal oxides.

5. The jig of claim 1, wherein the metal oxide coated layer extends up a side surface of the substrate.

6. The jig of claim 5, wherein a main component of the metal oxide coated layer is an oxide selected from the group consisting of zirconia, alumina, alumina-zirconia, alumina-magnesia spinel, and magnesia.

7. The jig of claim 5, wherein the intermediate layer extends along the top surface of the substrate.

8. The jig of claim 5, wherein, the intermediate layer is formed between the substrate and each of the zirconia surface layer and the metal oxide coated layer.

9. A jig of claim 1, wherein the metal oxide coated layer is free of zirconia.

10. The jig of claim 1, wherein,
    a thickness of the zirconia surface layer is from 50 to 500 µm, and
    a thickness of the metal oxide coated layer is from 50 to 500 µm.

11. The jig of claim 1, wherein the substrate comprises a porcelain.

12. The jig of claim 1, wherein the substrate comprises a baked-mud.

13. The jig of claim 1, wherein the intermediate layer extends along the top surface of the substrate.

14. The jig of claim 1, wherein, the intermediate layer is formed between the substrate and each of the zirconia surface layer and the metal oxide coated layer.

* * * * *

UNITED STATES PATENT AND TRADEMARK OFFICE
CERTIFICATE OF CORRECTION

PATENT NO. : 7,601,442 B2
APPLICATION NO. : 12/166734
DATED : October 13, 2009
INVENTOR(S) : Kazutomo Hoshino et al.

It is certified that error appears in the above-identified patent and that said Letters Patent is hereby corrected as shown below:

On the title page, Item (73) to read as follows:

--(73)   Assignee:   Mitsui Mining & Smelting Co., Ltd.,
                     Tokyo (JP)--.

Title Page, Item (62) to read as follows:

--(62)   Division of application No. 10/525,758, filed on Feb. 28, 2005, now abandoned, which is a 371 of PCT/JP2003/011124, filed on Aug. 29, 2003.--.

Title Page, Insert Item (30) above Item (51) as follows:

--(30)   Foreign Application Priority Data

Aug. 30, 2002  (JP) ............. 2002-253079
Aug. 30, 2002  (JP) ............. 2002-253042
Oct. 18, 2002  (JP) ............. 2002-304876
Oct. 21, 2002  (JP) ............. 2002-305924.--.

Signed and Sealed this

Twenty-fourth Day of November, 2009

David J. Kappos
*Director of the United States Patent and Trademark Office*